United States Patent
Shawcross

(10) Patent No.: US 7,352,103 B2
(45) Date of Patent: Apr. 1, 2008

(54) MOTOR ASSEMBLY WITH A SEALED COMMUTATOR/BRUSH INTERFACE

(75) Inventor: James P. Shawcross, Hudson, OH (US)

(73) Assignee: Ametek, Inc., Kent, OH (US)

( * ) Notice: Subject to any disclaimer, the term of this patent is extended or adjusted under 35 U.S.C. 154(b) by 0 days.

(21) Appl. No.: 11/498,026

(22) Filed: Aug. 2, 2006

(65) Prior Publication Data

US 2008/0030098 A1 Feb. 7, 2008

(51) Int. Cl.
H01R 39/38 (2006.01)

(52) U.S. Cl. .................. 310/239; 310/88; 310/233; 310/220

(58) Field of Classification Search ........ 310/219–247, 310/85, 88, 90
See application file for complete search history.

(56) References Cited

U.S. PATENT DOCUMENTS

| 4,476,410 A | * | 10/1984 | Wolcott | 310/228 |
| 5,345,132 A | * | 9/1994 | Sasaki et al. | 310/239 |
| 6,097,128 A | * | 8/2000 | Ko | 310/239 |
| 6,417,595 B1 | * | 7/2002 | Wasson | 310/220 |
| 7,102,266 B2 | * | 9/2006 | Coles | 310/239 |

* cited by examiner

Primary Examiner—Dang Le
(74) Attorney, Agent, or Firm—Renner Kenner Greive Bobak Taylor & Weber

(57) ABSTRACT

A motor assembly includes a commutator having a shaft extending axially therefrom, a commutator end bracket assembly, and at least two brushes carried by the commutator end bracket assembly and in contact with the commutator. A disc is carried by the commutator for rotation therewith. The commutator includes a notch and the disc is rotatable therein.

13 Claims, 4 Drawing Sheets

MOTOR ASSEMBLY WITH A SEALED COMMUTATOR/BRUSH INTERFACE

TECHNICAL FIELD

The present invention is generally directed to motor assemblies. In particular, the present invention is directed to a sealed commutator/brush interface area of a motor assembly so as to restrict entry of volatile material into the interface area and contain carbon dust. Specifically, the present invention is related to a motor assembly which employs a seal around the commutator/brush interface so as to contain carbon dust generated from the brush in a confined area so as to eliminate the possibility of arcing between the brushes and a shaft bearing or a motor housing.

BACKGROUND ART

It is well known that carbon brushes utilized in motor assemblies wear and generate carbon dust after prolonged motor use. Indeed, carbon dust is generated and thereafter migrates to various areas around the motor assembly. This is problematic in that some motor assemblies are used to pump or move highly volatile organic compounds such as paint and the like. The commutator brush interface causes sparking which in turn generates carbon dust. An accumulation of carbon dust may result in arcing between the interface area and the motor shaft or motor housing. The potential arcing in an environment of volatile organic compounds presents a significant safety hazard for those in proximity to the motor assembly. Yet another drawback of the carbon dust generation is that the dust migrates toward the bearings supporting the motor shaft. This dust may create an electrical shorting path and if this occurs the motor may be damaged or rendered inoperative.

One attempt at solving the problem of sparking highly combustible materials is presented in U.S. Pat. No. 6,417,595. This patent discloses a seal that partially isolates the commutator assembly from the internal ambient atmosphere of the electric motor. However, the disclosed seal still provides gaps to allow migration of the carbon dust and as such sparking may still occur. Yet another problem with the assembly disclosed in the '595 patent and other similar assemblies, is that the carbon brush dust tends to collect in unwanted areas. Therefore, there is a need for an improved system to seal carbon dust within a confined area and prevent its migration to other areas of the motor assembly.

SUMMARY OF THE INVENTION

In view of the foregoing, it is a first aspect of the present invention to provide a motor assembly with a sealed commutator/brush interface.

Another aspect of the present invention, which shall become apparent as the detailed description proceeds, is achieved by a motor assembly comprising a commutator having a shaft extending axially therefrom, a commutator end bracket assembly, at least two brushes carried by the commutator end bracket assembly and in contact with the commutator; and a radially projecting disc carried by the commutator, wherein the commutator end bracket assembly includes a notch, the radially projecting disc being received in the notch for rotation therein.

BRIEF DESCRIPTION OF THE DRAWINGS

For a complete understanding of the objects, techniques and structure of the invention, reference should be made to the following detailed description and accompanying drawings, wherein.

BEST MODE FOR CARRYING OUT THE INVENTION

Figure 1:
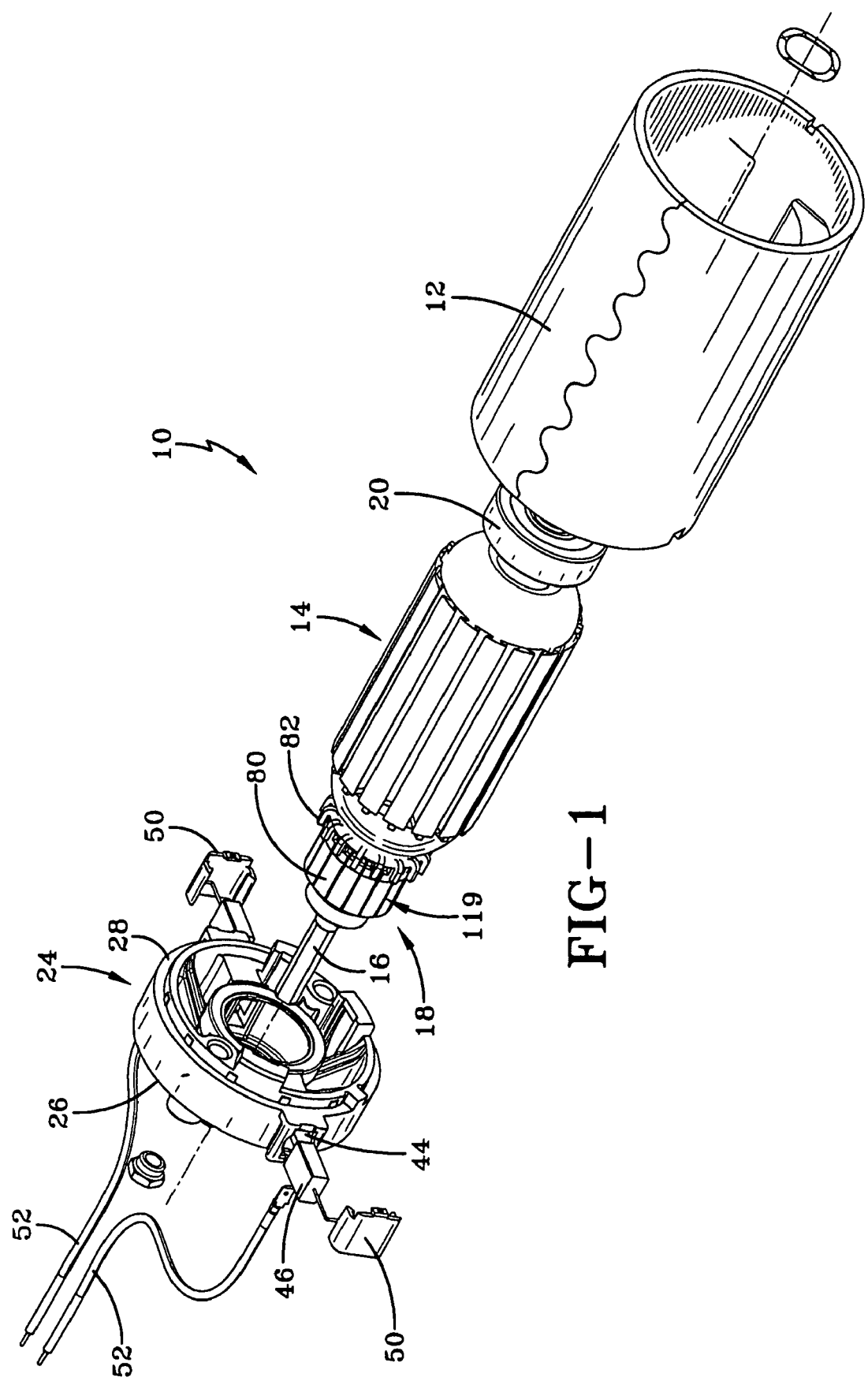
FIG. 1 is an exploded perspective view of a motor assembly made in accordance with the concepts of the present invention.

Referring now to the drawings and in particular to FIG. 1 it can be seen that a motor assembly with a sealed commutator/brush interface is designated generally by the numeral 10. Although the motor assembly described herein is used primarily for paint sprayers and the like, it will be appreciated that the concepts disclosed herein are equally applicable to other types of motor assemblies. And the motor described herein is a 2-pole motor. Of course, the aspects described herein are equally applicable to 4-pole or other multiple pole motor assemblies. The motor assembly 10 includes a housing 12 which encloses an armature assembly 14. Axially extending from the armature assembly is a rotatable shaft 16 that carries a commutator 18. A distal bearing 20 is carried by one end of the shaft 16 for rotatable support of the armature assembly within the housing 12. A commutator end bracket assembly 24 rotatably receives an end of the shaft 16 opposite the distal bearing 20. The commutator end bracket assembly 24 includes a bearing side 26 which is opposite a housing side 28. The housing side 28 is received by and mates with the housing 12 and is supported thereby.

Figure 2:
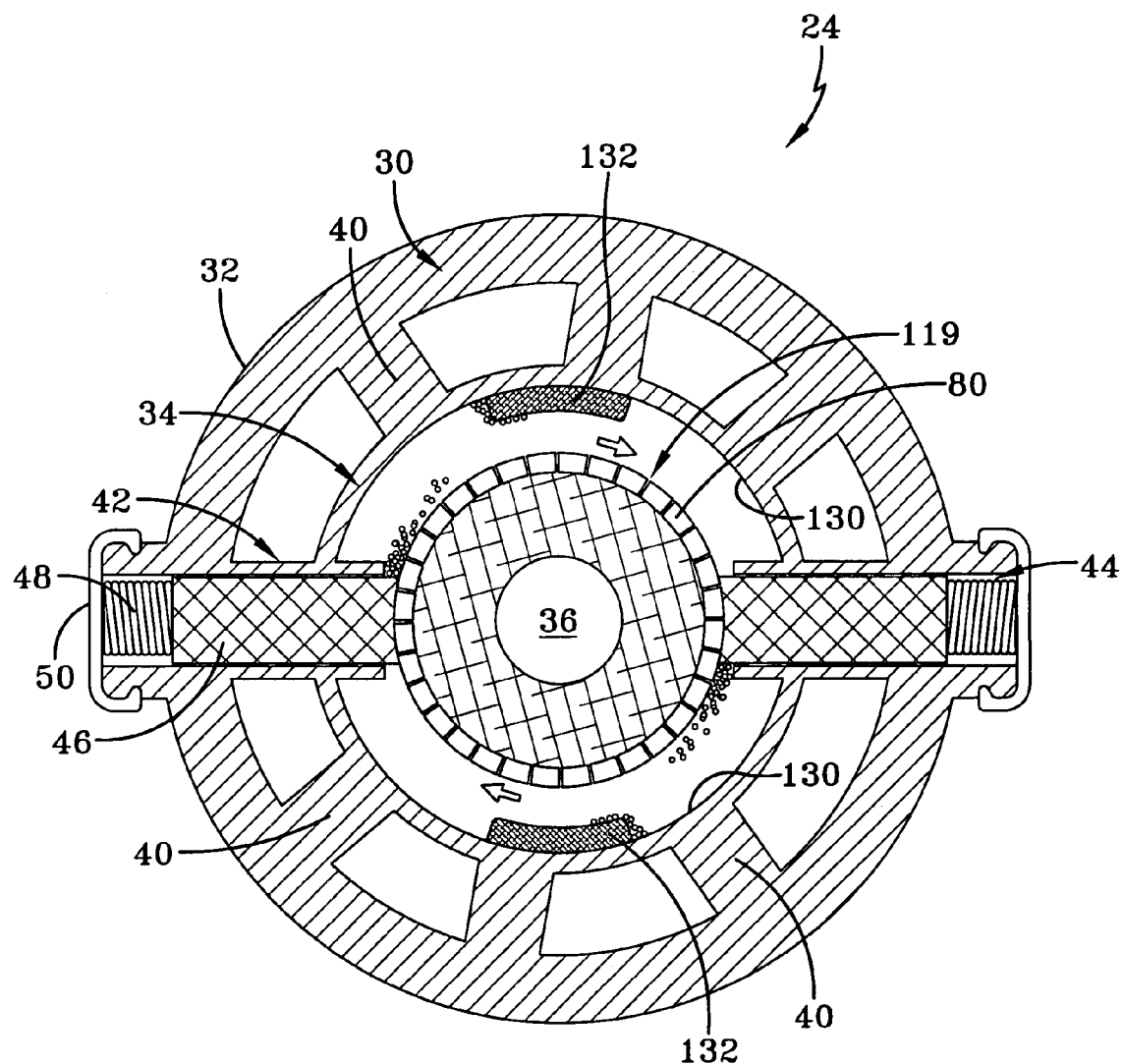
FIG. 2 is a cross-sectional view of an end bracket assembly provided in the motor assembly and made in accordance with the concepts of the present invention.

As best seen in FIG. 2, the end bracket assembly 24 includes an outer ring 30 which has an outer ring surface 32. Concentrically disposed within the outer ring 30 is an inner ring 34. The inner ring 34 may be axially displaced with respect to the outer ring 30 away from the housing so as to accommodate components of the commutator 18. The inner ring 34 provides an axial opening 36 therethrough so as to rotatably receive the commutator 18. A plurality of radial ribs 40 may angularly and axially extend between the outer ring 30 and the inner ring 34.

A pair of diametrically opposed brush tubes 42 also connect the outer ring 30 to the inner ring 34. Each brush tube 42 has a brush opening 44 to receive a brush 46. A pair of brushes are used in this embodiment and as such the motor assembly 10 is known in the art as a two-pole motor. It will be appreciated that the brushes 46 may be made of carbon, a carbon composite material or other like material that is used for brushes in electric motor assemblies. The brushes allow for electrical connection to the rotatable commutator 18 so as to generate rotation of shaft 16 when electricity is applied to the brushes 46. Also contained within the brush tubes 42 are springs 48 that bias the brush against the commutator 18. Each brush tube is enclosed at the end opposite the commutator by a brush cap 50 which also provides for connection of a power lead 52 to the spring which is mechanically and electrically connected to the brushes 46. It will be appreciated that as the commutator is rotated and bears against the ends of the brushes 46 that the frictional interaction between the two surfaces causes sparking and brush dust to be generated from the brushes. In order to minimize migration of the dust, which causes the problems previously discussed, it is desirable to confine that dust within the area defined by the inner ring 34.

Figure 3:
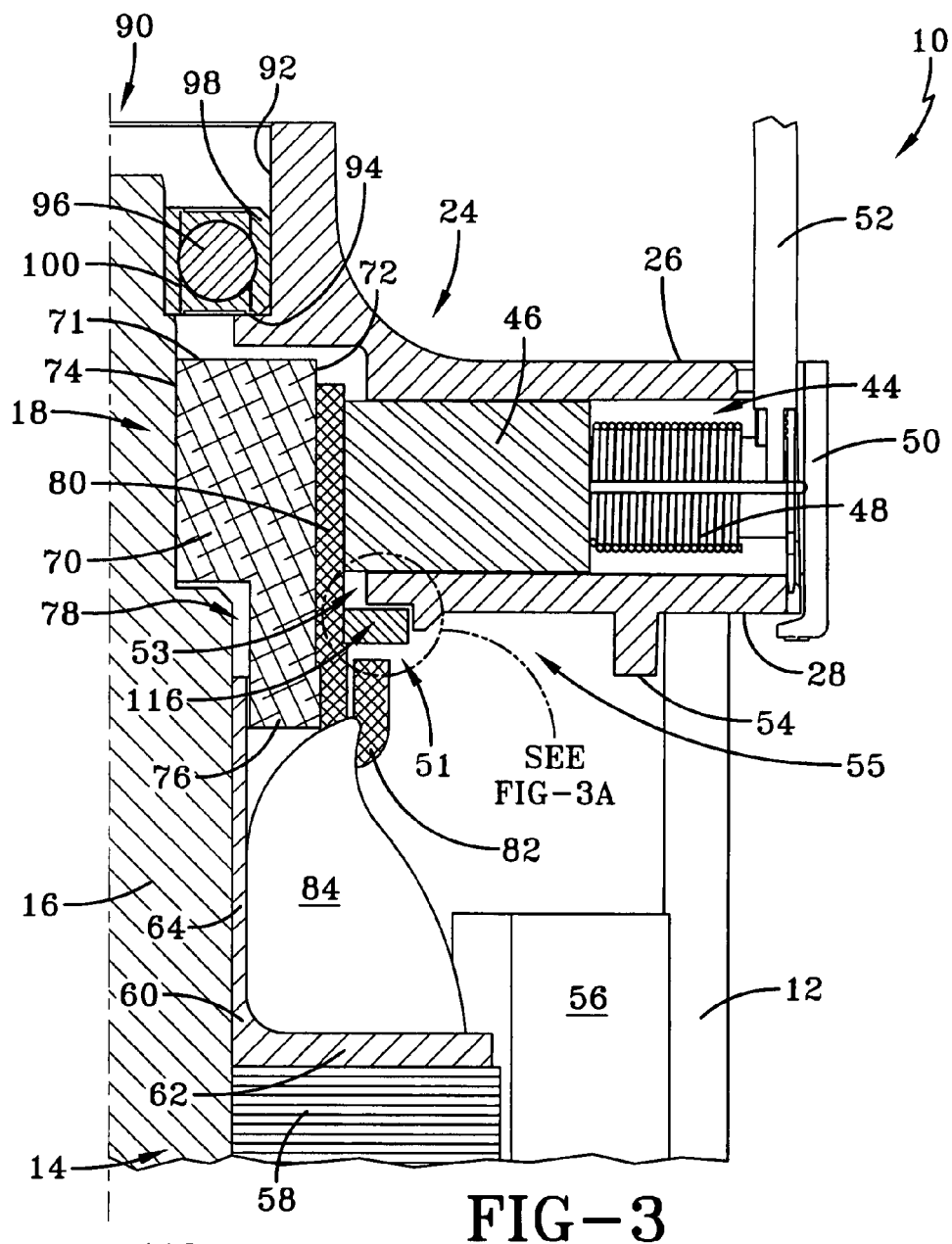
FIG. 3 is a partial cross-sectional view of the end bracket assembly incorporating a commutator seal.

Referring now to FIG. 3, it can be seen that a commutator sealing arrangement 51 is provided that prevents migration of dust from the area 53 defined by inner ring 34 to the area 55 defined by housing 12. Likewise, volatile ambient air is inhibited from entering inner ring 34. It will be appreciated that commutator sealing arrangement 51, may be combined with any form of bearing seal, positioned at the opposed end of commutator 18 from commutator sealing arrangement 51. Exemplary bearing seals are disclosed in U.S. patent Ser. No. 11/054,666 which is hereby incorporated by reference.

End bracket assembly 24 includes a downwardly axially extending rim 54 that is received within housing 12 and facilitates assembly of end bracket 24 to the housing 12. Rim 54 may be frictionally received and/or mechanically fastened to the housing 12. A plurality of magnets 56 are disposed within the interior of housing 12 and are utilized in the operation of the motor.

The armature assembly 14 includes a lamination stack 58 that is secured to shaft 16 and disposed in a positional relationship with the magnets 56 in a manner well known in the art. An insulator 60 is disposed on a lamination in the stack 58 closest to the bracket assembly and a portion of the shaft 16. In particular, the insulator 60 includes a leg 62 which is disposed on the uppermost lamination and a body 64 which is disposed around the shaft 16. The insulator 60 rotates as the shaft rotates.

The commutator 18, which is also secured to the shaft 16, includes a core 70 that is manufactured from an insulating molded plastic material. The core 70 includes a radial face surface 71 that faces the end bracket assembly and an exterior surface 72 that faces the brush assemblies. In particular, the core 70 includes a sleeve 74 from which a collar 76 axially extends toward the lamination stack 58. Collar 76 and shaft 16 form a gap 78 therebetween that extends past and covers a portion of the insulator body 64. Radially disposed about the sleeve 74 and the collar 76 are a plurality of commutator bars 80 which are inset into the exterior surface 72. Each commutator bar 80 has a tang 82 which is electrically and mechanically connected to a wire winding 84. It will be appreciated that the commutator bars 80 are in selective engaging contact with the brushes 46 as the commutator rotates.

The end bracket assembly 24, proximal the bearing side 26, provides an axial bracket opening 90 therethrough. The opening 90 is defined by an internal surface 92 from which an internal ledge 94 extends radially inwardly. An end bearing 96 is received in the opening 90 and is supported by the internal surface 92 and the internal ledge 94. In particular, the end bearing 96 includes an outer race 98 that is supported by the ledge and an inner race 100 that rotatably receives the shaft 16.

Figure 3A:
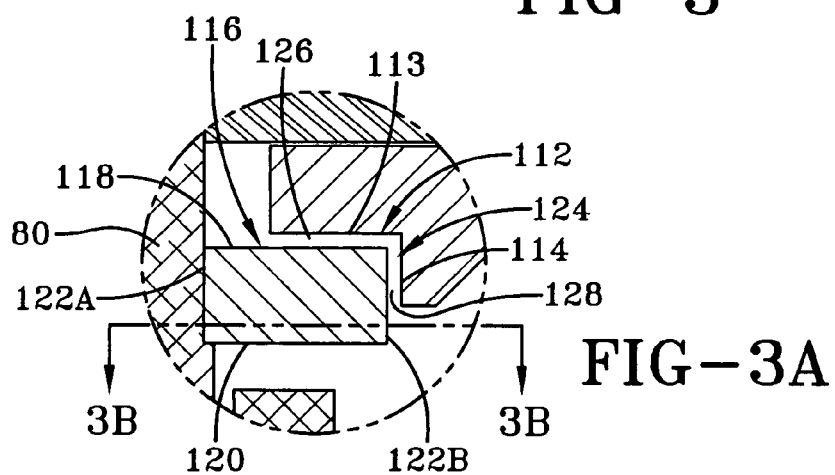
FIG. 3A is a detailed illustration of the commutator seal.
Figure 3B:
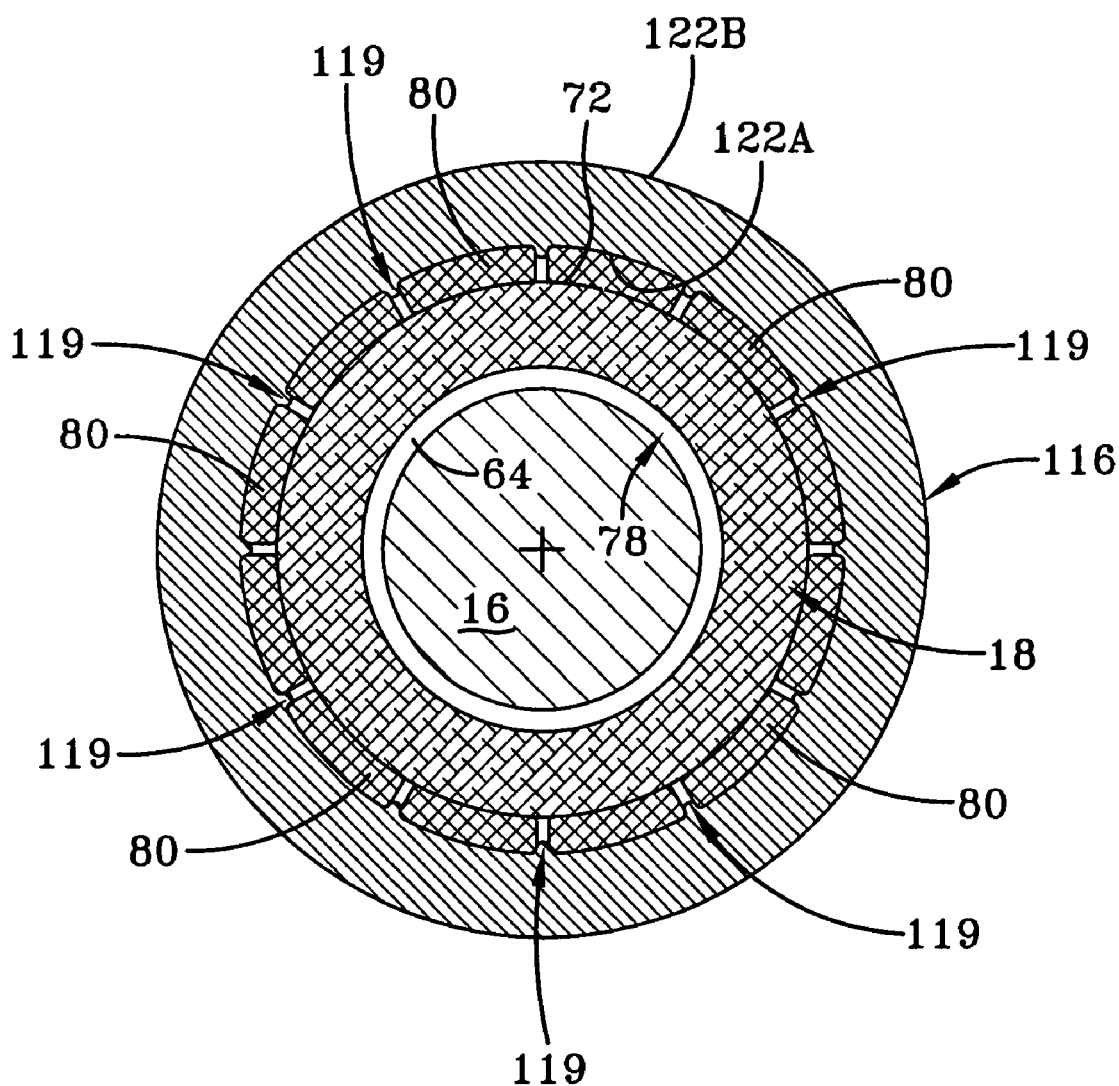
FIG. 3B is a partial cross-sectional view of the end bracket assembly taken along lines 3B-3B of FIG. 3A.

As seen in FIGS. 3 and 3A, commutator seal arrangement 51 is provided to inhibit air and particulate communication between inner ring are 53 and housing area 55. The housing side 28 of bracket 24 includes a notch 112 that is formed on an inner periphery of inner ring 34 and along an end of the brush tube 42 that is adjacent commutator bars 80. Notch 112 includes a radially extending surface 113 and an axially extending surface 114.

A sealing disc 116 is secured to commutator 18 and extends radially outward therefrom. As is evident from FIG. 3, sealing disc 116 is aligned with notch 112 and is rotatable therein. Sealing disc 116 does not, however, contact bracket 24. Thus no frictional contact occurs which may reduce motor efficiency.

Sealing disc 116 includes an inner surface 118 and opposed outer surface 120 spaced by end surfaces 122A and 122B. Inner surface 118 faces the brushes 46 and outer surface 120 faces lamination stack 58. Sealing disc 116 fills in the gaps 119 between the plurality of commutator bars 80 and consequently prevents migration of dust from brush 46 and the plurality of commutator bars 80 into the internal cavity formed by the motor housing 12. It will be appreciated that the sealing disc 116 is made of an insulated polymeric material and as such does not provide for any electrical conduction between the commutator bars. An exemplary sealing material is expanded polytetrafluoroethylene.

As is evident from FIG. 3A, a labyrinth channel 124 is formed in the area between sealing disc 116 and notch 112. Labyrinth channel 124 includes a first passage 126 formed between radially extending surface 113 and inner surface 118. A second passage 128 is angularly offset approximately 90 degrees from first passage 126 and communicates therewith. Second passage 128 is formed between end surface 122 and axially extending surface 114. It should thus be evident that, while allowing some indirect communication of air into the area defined by inner ring 34, labyrinth channel 124 significantly inhibits carbon dust migration. Specifically, labyrinth channel 124 provides a relatively small cross-sectional area through which the carbon dust might travel. Ideally, it is believed that the channel 124, and specifically the passages 126 and 128 have a spacing of about 0.005" to about 0.015". This spacing refers to the distance between the surfaces 113 and 114 of the notch 112, and the respective facing surfaces 118 and 122 of the disc 116. Further, because labyrinth channel 124 provides a non-direct path, due to the 90 degree turn therein, carbon dust is inhibited from exiting inner ring area 53. In this manner, carbon dust is safely contained and prevented from damaging other motor parts.

Referring now to FIG. 2, inner ring 34 includes an inner ring surface 130 that faces commutator 18. A carbon dust retainer 132 may be secured to inner ring surface 130 and functions to collect carbon dust thereon. Dust retainer 132 may be secured to inner ring surface 130 with adhesives, fasteners, or the like, and may be in the form of an elongated axially extending fabric strip. In one or more embodiments retainer 132 may be a felt strip. In other embodiments the strip may be saturated in an oil-based material. In the present embodiment two dust retainers 132 are provided, but it should be appreciated that more or less may be included. When carbon dust contacts retainers 132, they adhere thereto, and are prevented from migrating away from commutator 18. Further, by collecting carbon dust on retainers 132, dust buildup within inner ring area 53 is prevented. This buildup, if left unchecked, may short the commutator bars 80, causing premature motor failure.

Based upon the foregoing, the advantages of the constructions described above are readily apparent. In particular, the commutator sealing arrangement 51 is configured to provide an effective seal without frictional contact between the commutator 18 and bracket 24. As such, the dust is contained within a confined area, where it is eventually captured by dust retainers 132 to prevent dust from migrating away from the brush/commutator bar interface. This significantly minimizes the possibility of arcing between the brushes and other components within the motor housing assembly.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. A motor assembly comprising:
   a commutator having a rotatable shaft extending axially therefrom, said commutator having an exterior radial surface;
   a commutator end bracket assembly;
   at least two brushes carried by said commutator end bracket assembly and in contact with said exterior radial surface of said commutator; and
   a radially outwardly projecting flat disc extending from said exterior radial surface of said commutator and rotating therewith, said radially outwardly projecting flat disc having an uninterrupted flat inner surface facing said at least two brushes;
   wherein said commutator end bracket assembly includes a notch, said radially projecting flat disc being received in said notch, but not contacting said commutator end bracket for rotation therein.

2. The motor assembly according to claim 1, wherein said notch includes a radially extending surface and an axially extending surface.

3. The motor assembly according to claim 2, wherein spacing between said radially projecting disc and said commutator end bracket assembly is about 0.005" to about 0.015".

4. The motor assembly according to claim 2, wherein said flat inner surface faces said radially extending surface, and wherein said disc has an end surface facing said axially extending surface, and wherein said respective facing surfaces form respective passages therebetween.

5. The motor assembly according to claim 1, further comprising a housing and said commutator bracket including a housing side, wherein said notch is provided on said bracket housing side.

6. The motor assembly according to claim 1, wherein said disc and said notch form a labyrinth channel.

7. The motor assembly according to claim 6, wherein said labyrinth channel includes a first channel and a second channel angularly offset from said first channel by about 90 degrees.

8. The motor assembly according to claim 1, wherein said commutator bracket includes an inner ring which is set back from and surrounds and faces at least a portion of said commutator.

9. The motor assembly according to claim 8, further comprising a dust retainer secured to said inner ring and directly facing said commutator.

10. The motor assembly according to claim 9, wherein said dust retainer comprises at least one felt strip saturated with an oil-based product.

11. The motor assembly according to claim 10, further comprising a pair of felt strips extending axially on said inner ring and which are diametrically opposed.

12. The motor assembly according to claim 1, wherein said commutator has a plurality of commutator bars extending from said exterior radial surface, said commutator bars having gaps therebetween, and wherein said disc fills in said gaps between said commutator bars.

13. The motor assembly according to claim 1, wherein rotation of said rotatable shaft rotates said radially outwardly projecting flat disc and propels carbon dust generated by contact between said brushes and said exterior radial surface of said commutator radially outwardly away from said commutator.

* * * * *